March 25, 1924.
J. F. LAWRENCE
SELF HEATING SOLDERING IRON
Filed Aug. 13, 1921      2 Sheets-Sheet 2
1,487,864
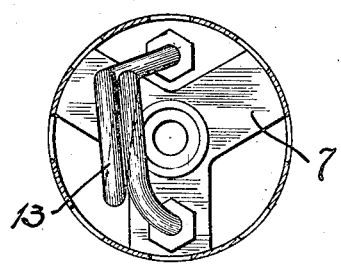
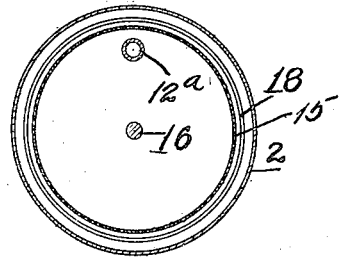
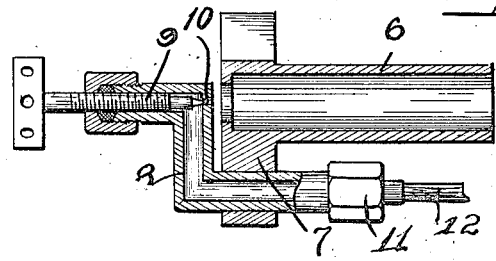
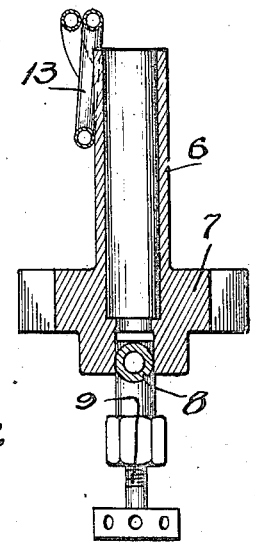
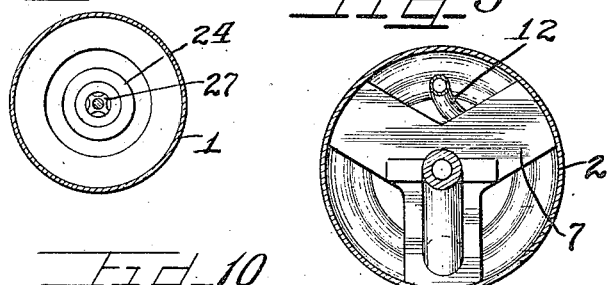
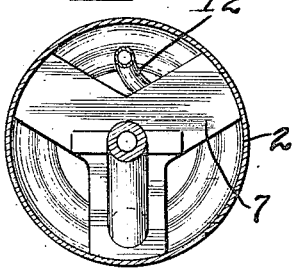
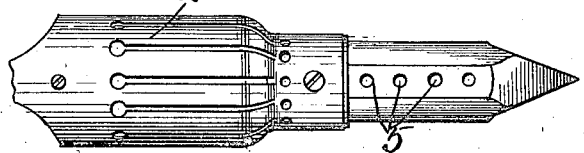
Witnesses
J. W. Angell
Charles W. Hill Jr.
Inventor
Jay F. Lawrence
by Charles W. Hill, Atty.

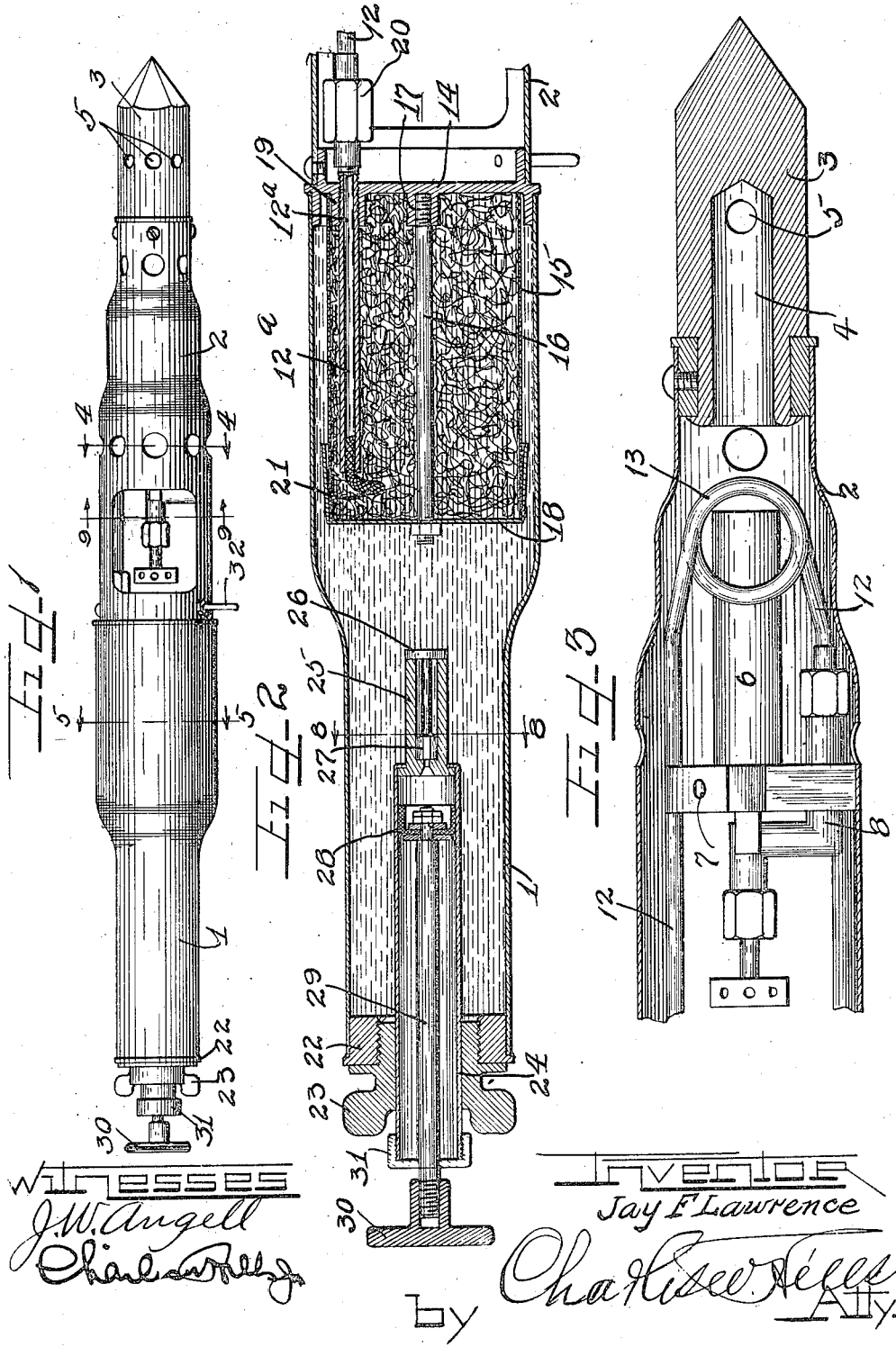

Patented Mar. 25, 1924.

1,487,864

UNITED STATES PATENT OFFICE.

JAY F. LAWRENCE, OF CHICAGO, ILLINOIS.

SELF-HEATING SOLDERING IRON.

Application filed August 13, 1921. Serial No. 491,905.

*To all whom it may concern:*

Be it known that I, JAY F. LAWRENCE, a citizen of the United States, and a resident of the city of Chicago, in the county of Cook and State of Illinois, have invented certain new and useful Improvements in a Self-Heating Soldering Iron; and I do hereby declare that the following is a full, clear, and exact description of the same, reference being had to the accompanying drawings, and to the numerals of reference marked thereon, which form a part of this specification.

My invention relates more particularly to a soldering iron that embodies means for heating the same while in use so that the same may be used continuously without interruptions for heating purposes, in the most efficient way.

It is an object of my invention to provide a soldering iron with an efficient heating system.

It is a further object of my invention to employ a liquid fuel that is rarefied and partially gasified by the heat caused by the combustion in the fire chamber.

It is also an object of my invention to provide a novel structure and arrangement adapted for attaining the above objects and producing the most practical and efficient device, as will become more apparent in the following description and disclosures.

My invention (in a preferred form) is illustrated in the accompanying drawings and hereinafter more fully described and pointed out in the appended claim.

In the drawings:

Fig. 1 is a perspective view of a soldering iron.

Fig. 2 is a central longitudinal section through a portion of the soldering iron showing the fuel reservoir and filter upon an enlarged scale.

Fig. 3 is a central sectional view showing the fire chamber and the fuel conducting system upon an enlarged scale.

Fig. 4 is a section on the line 4—4 of Fig. 1 upon an enlarged scale.

Fig. 5 is a section on the line 5—5 of Fig. 1 with the filtering material omitted and upon an enlarged scale.

Fig. 6 is a central section through a part of the fuel feeding device.

Fig. 7 is a central section through the fuel feeding device in a plane at right angles to the plane in which Fig. 6 was taken.

Fig. 8 is a section on the line 8—8 of Fig. 2 showing the valve construction.

Fig. 9 is a section on the line 9—9 of Fig. 1.

Fig. 10 is a perspective view of a modified form.

As shown in the drawings:

In the different figures of the drawing, similar features are denoted by similar reference characters.

And for the purpose of illustrating my invention, I have shown in the different figures of the drawing one embodiment which my invention may assume and which represents in a practical way the best means now at my command for practicing my invention. In referring to the different figures, it will be observed that my soldering device or iron comprises a hollow handle portion 1 closed at the upper and lower ends to define a fuel reservoir, a perforated housing section 2 removably secured to the handle section and a soldering tool 3 removably secured to the lower end of the perforated section 3. By making the device in the enumerated parts, it is a simple matter to install or remove the feeding mechanism within the housing 2 and to substitute a new tool for an old one.

The tool member 3 is provided with a fire chamber 4 preferably located centrally thereof and extending from the top to a point well toward the working edge of the tool so that the radiated heat will readily heat the point of the tool to the proper soldering temperature. The fire chamber 4 is perforated by means of the air holes 5 to admit sufficient air for supplying the necessary oxygen for combustion.

Mechanism is provided for supplying or feeding fuel to the chamber 4. This mechanism is principally located in the housing section 2, having air inlet holes as shown in Fig. 1 or air inlet slits as shown in Fig. 10, so that a proper mixture of fuel and air may be supplied to the fuel chamber, and comprises a fuel guiding pipe or conduit 6 (see Figs. 3 and 6) having a head 7 consisting of radiating arms secured to the wall of the section 2. One arm of the head 7 forms a support for the valve mechanism 8 which extends through an aperture in said arm and projects over the center of the fuel guiding pipe 6 at which point an adjustable needle valve 9 is provided which cooperates with a small fuel feeding outlet 10 through which the fuel is fed to the guiding pipe 6 which extends downwardly to a point not far above the fire chamber 4. A feeding pipe 12 is coupled to the valve mechanism by the usual rod coupling 11 and extends to a point substantially adjacent the fire chamber where the same is looped into circular form and extends upwardly into the fuel reservoir. This looped portion 13 causes the fuel which is usually in some liquid form to remain in the heat zone sufficiently long so that it will become partially gasified before it reaches the needle valve 9.

The fuel reservoir is preferably formed by soldering or welding a double-flanged disk 14 in the bottom of the handle member 1, one flange thereof forming a tight fit with the interior wall of the handle member and the other flange receiving the housing section 2 thereover, and within the reservoir there is preferably provided some filtering means, which may consist of a cylindrical screen 15 resting upon the disk 14 and anchored thereto by means of a screw 16 which is screwed into a boss 17 on the disk 14; the upper end of the screen being closed by a flanged cover 18 which fits over the top thereof and through which the screw 16 projects. The upper end of the screw 16 is provided with an adjusting nut whereby the screen can be firmly clamped and secured in place. This screen is preferably of a diameter a little less than the interior diameter of the reservoir, and surrounds an internally threaded boss 19 in which the upper section 12ª of the feed pipe 12 is secured as by screw threads or the like. For convenience in assembling the pipe section 12ª is preferably coupled to the pipe 12 by the usual rod coupling 20.

In order to properly filter and strain the liquid fuel so as not to clog the needle valve the screen 15 is filled with some filtering and straining substance such as cotton waste or the like, and a wick 21 may be inserted in the upper end of the pipe section 12ª as a further precaution. The liquid fuel will enter through the circumferential walls of the screen and seep through the filter and be absorbed by the wick 21 into the feeding pipe as is obvious. It is evident that gravity will cause a certain amount of flow through the feeding pipe, but if the device is so positioned that gravity cannot act, or if gravity does not cause a sufficient flow of liquid fuel through the feeding pipe, it becomes necessary to force the feeding of the liquid fuel in some way. And for this purpose, I have constructed an air pump which is secured in the top of the reservoir and extends down into the liquid fuel. To produce a simplified and readily operable structure, I preferably weld or solder a nut 22 in the upper end of the reservoir 1, and screw a hollow externally threaded nut 23 therein through which the cylinder 24 of the air pump extends. A valve mechanism is hermetically sealed or secured in the lower end of the cylinder, and comprises an elongated member 25 having a bore in which the stem of a valve 26 is slidably secured, the upper end of the stem being provided with a grooved guiding head 27 (see Figs. 2 and 8). The bore of the valve mechanism communicates with the air cylinder, and the construction is such that the air will be forced through the grooves in the head 27 and dislodge the valve 26 whereby the air will enter the fuel reservoir and cause sufficient pressure to force a proper feeding of the fuel oil. The pressure of the oil in the reservoir will hence be sufficient to keep the valve 26 firmly seated during the inoperative stroke of the piston 28 which operates in the cylinder 24 and is guided by its rod 29 which passes through the cover cap 31 which closes the upper end of the cylinder. The piston 28 and its rod 29 are of usual construction and are operated by means of the push knob 30 on the outer end of the piston rod. The grooves in the head 27 are preferably so designed that very little oil if any can percolate therethrough if the same should find its way into the valve bore. The soldering device may be supported in a recumbent position by means of the projection 32 as is obvious.

*Operation.*

If the reservoir 1 does not contain sufficient oil, it is obvious that the same may be filled by unscrewing and raising the nut 23. Assuming now that it is desired to solder a joint, it will only be necessary to operate the pump to force the fuel oil through the feeding pipe and the needle valve 10 so that the same may fall or find its way into the fire or combustion chamber 4 where the same may be ignited. The heat of combustion will immediately act upon the coil 13 in the feeding pipe to partially gasify the liquid fuel passing therethrough. The gasified product will be properly aerated by means of the perforations in the housing 2 and a strong flame will result which will greatly hasten the proper heating of the tool 3. It should be noted that this soldering device can be used and operated at any angle or position on account of the forced feed system that I employ.

It is therefore obvious that I have invented a self-heating soldering device that can be continuously used and does not require an extra fire to heat the same as is now commonly necessary, and that the heating system thereof is a novel application which is efficient and universally serviceable.

I am aware that numerous details of construction may be varied through a wide range without departing from the principles of this invention, and I therefore do not purpose limiting the patent granted otherwise than necessitated by the prior art.

I claim as my invention:

A self-heating soldering device, comprising a fire chamber, a fuel reservoir, a needle valve for feeding fuel to said fire chamber, a disk closing the lower end of said fuel reservoir, a cylindrical screen in said fuel reservoir spaced from the wall of the latter, a flanged cover for said screen, a screw extending centrally and longitudinally through said screen and connecting said cover with said disk, and a fuel supply pipe leading from the interior of said screen through said disk to said needle valve.

In testimony whereof I have hereunto subscribed my name in the presence of two subscribing witnesses.

JAY F. LAWRENCE.

Witnesses:
 CARLTON HILL,
 E. W. WEIKERT.